(No Model.)
S. G. SMITH.
SPRING FOR VEHICLES.
No. 308,000. Patented Nov. 11, 1884.
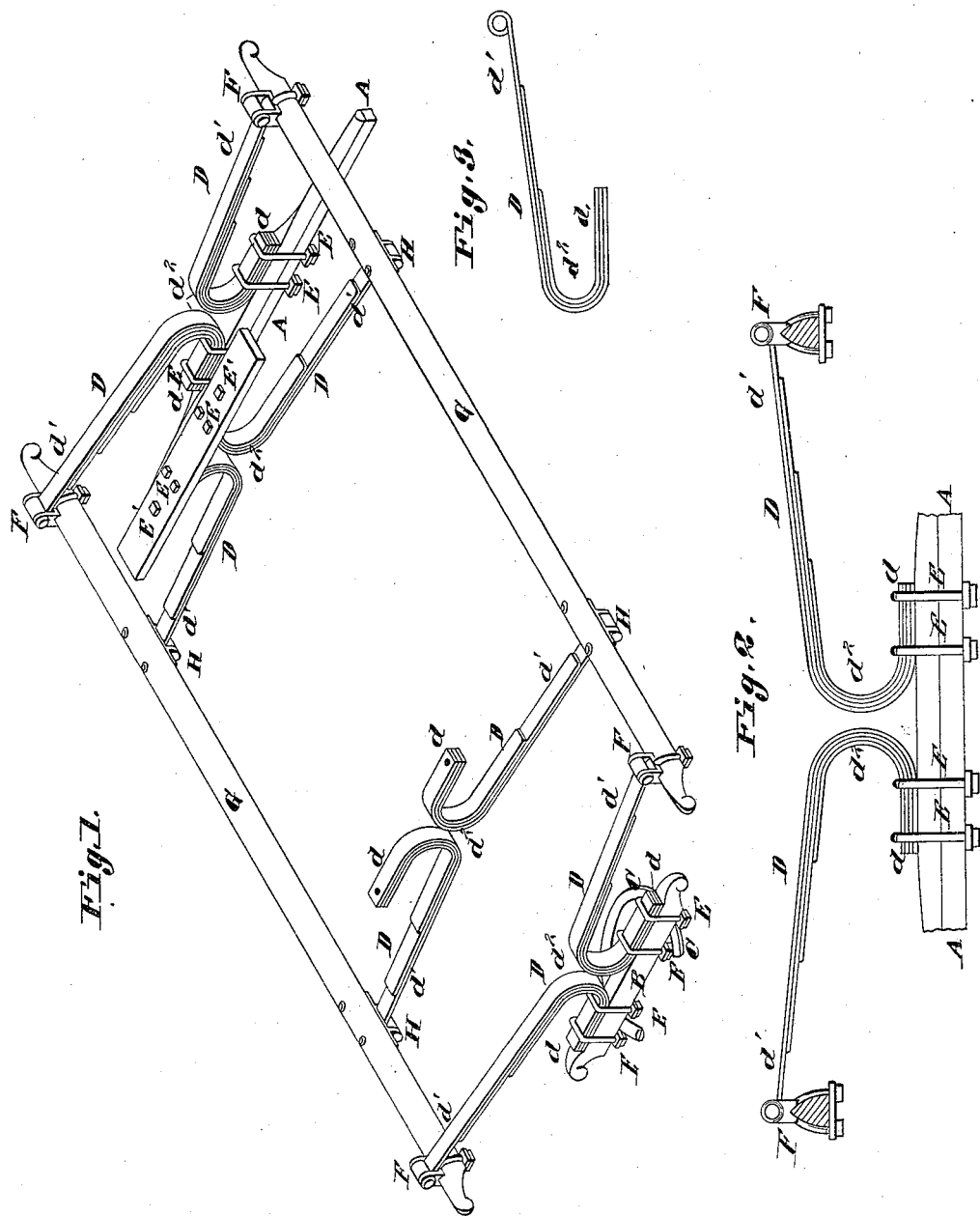
Attest:
Charles Pickles
Geo. L. Wheelock
Inventor:
Stephen G. Smith
By Knight Bros.
Attys.

UNITED STATES PATENT OFFICE.

STEPHEN G. SMITH, OF HANNIBAL, MISSOURI.

SPRING FOR VEHICLES.

SPECIFICATION forming part of Letters Patent No. 308,000, dated November 11, 1884.

Application filed July 28, 1884. (No model.)

*To all whom it may concern:*

Be it known that I, STEPHEN G. SMITH, of Hannibal, in the county of Marion and State of Missouri, have invented a certain new and useful Spring for Vehicles, of which the following is a full, clear, and exact description, reference being had to the accompanying drawings, forming part of this specification.

The spring belongs to that class in which one end is made with a return bend and comparatively rigid and rigidly attached to a part of the vehicle, and the other end is made flexible and hinged to another part.

Figure 1 is a perspective view showing the improvement applied to the side bars of a vehicle. Fig. 2 is an enlarged transverse section showing a pair of the springs in side view. Fig. 3 is a side view of one of the springs.

A pair of these springs may in general take the place of an elliptical or half-elliptical spring.

A is the rear axle of a vehicle, and B is the head-block, which rests on the fifth-wheel, whose upper member is shown at C. Two of the springs D are shown attached to the head-block by means of clips E, embracing the head-block and spring. The spring may be composed of a single leaf or of more than one. As it is required that the fixed end $d$ of the spring should have greater strength than the moving end $d'$, the spring is preferably made with two or more leaves, (in most cases,) as this construction is the cheapest and best for making the parts with the required proportionate strength. Near the larger and fixed end of the spring is a curved portion, $d^2$, which is nearly one-half of a circle, as shown; but the degree of curve is non-essential. The larger end $d$ has at least sufficient length clear of the curve $d^2$ for the bearing of the clips or bolts by which the attachment is made, so as to leave at least the whole of the curved part free to bend. Where it is desired to have a spring of great flexibility, the part $d$ may be increased in length, and the attachment made farther from the curved part, so as to leave a part of the portion $d$ free to bend. The free or movable ends of the springs D are connected by shackles F to the side bars, G. Other springs D are hinged to the side bars at H, and connected to the bottom I of the body by suitable clips or bolts, or both clips and bolts, E E'. The attachment, as shown, has a bolt E' passing through the end of each spring, and a clip E embracing it at a little distance from the end.

The means of attachment is not an essential part of my invention.

I have shown the springs as applied to a side-bar vehicle; but they may be applied to vehicles of other descriptions.

It will be seen that the springs possess advantages over half-elliptical springs in that their length, and consequently their flexibility, is greater. The pair of springs are in one plane, and consequently there is not the irregularity which is found in cases where the pair of springs are placed side by side, so as to be in different planes, and where attachment is made to different points on the two side bars or otherwise the springs are set obliquely or made with lateral curves.

I claim—

In combination with a rear axle, head-block, and side bars, the paired springs D, having return bends $d$, by which they are secured to the rear axle and head-block, and provided with flexible ends hinged to the side bars, as set forth.

STEPHEN G. SMITH.

Witnesses:
GEO. A. MCMILLEN,
J. N. BASKETT.